US012795178B2

(12) United States Patent
Liu et al.

(10) Patent No.: US 12,795,178 B2
(45) Date of Patent: Nov. 10, 2026

(54) TECHNIQUES FOR STORAGE LIFECYCLE MANAGEMENT FOR LIVE ORIGIN SERVERS

(71) Applicant: NETFLIX, INC., Los Gatos, CA (US)

(72) Inventors: Xiaomei Liu, Cupertino, CA (US); Robert Harold Hunter Ford, Golden Oak, FL (US); Rosanna Lee, Palo Alto, CA (US); Thiago Pontes, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 45 days.

(21) Appl. No.: 18/929,192

(22) Filed: Oct. 28, 2024

(65) Prior Publication Data

US 2026/0122289 A1 Apr. 30, 2026

(51) Int. Cl.
*H04N 21/2187* (2011.01)
*H04N 21/231* (2011.01)

(52) U.S. Cl.
CPC ... *H04N 21/2187* (2013.01); *H04N 21/23113* (2013.01); *H04N 21/23116* (2013.01)

(58) Field of Classification Search
CPC ......... H04N 21/2187; H04N 21/23113; H04N 21/23116
See application file for complete search history.

(56) References Cited

U.S. PATENT DOCUMENTS

| | | | | |
|---|---|---|---|---|
| 10,516,911 | B1 * | 12/2019 | Nielsen | H04N 21/4223 |
| 11,861,390 | B1 * | 1/2024 | Grechishkin | G06F 3/067 |
| 2015/0016661 | A1 | 1/2015 | Lord | |
| 2015/0208103 | A1 * | 7/2015 | Guntur | H04N 21/23439 725/61 |
| 2016/0021157 | A1 * | 1/2016 | Duerring | H04L 67/62 709/231 |
| 2018/0167434 | A1 * | 6/2018 | Sathyanarayana | H04L 67/146 |
| 2019/0073401 | A1 * | 3/2019 | Gupta | G06F 16/248 |
| 2021/0256029 | A1 * | 8/2021 | Danilov | G06F 16/2228 |

OTHER PUBLICATIONS

International Search Report for Application No. PCT/US2025/052725 dated Jan. 30, 2026.
Duff, Damien Jade, "Building a Live-stream Archive with Amazon Interactive Video Service", retrieved from https://medium.com/daemonthinking/buildinga-live-stream-archive-with-amazon-interactive-video-service-3670a1167313, Apr. 19, 2021, pp. 1-11.
Krings, Emily, "The Ultimate Guide to Live-to-VOD Archiving for Professional Broadcasters", retrieved from https://www.dacast.com/blog/live-to-vod/ Dec. 7, 2021, pp. 1-14.

* cited by examiner

*Primary Examiner* — Randy A Flynn
(74) *Attorney, Agent, or Firm* — Artegis Law Group, LLP

(57) ABSTRACT

One embodiment of a method for storing media content associated with live streaming events includes determining that a live streaming event has ended, in response, identifying a plurality of data files associated with the live streaming event, and copying the plurality of data files from a first storage associated with a live origin server to a second storage for further access.

20 Claims, 6 Drawing Sheets

TECHNIQUES FOR STORAGE LIFECYCLE MANAGEMENT FOR LIVE ORIGIN SERVERS

BACKGROUND

Field of the Various Embodiments

Embodiments of the present disclosure relate generally to computer science and media streaming, and, more specifically, to techniques for storage lifecycle management for live origin servers.

DESCRIPTION OF THE RELATED ART

Media streaming is the process of continuously transmitting media content over a network for playback by client applications executing on user devices. The media content typically includes video, audio, and/or text. Examples of media content that can be streamed include movies, television shows, and live event broadcasts.

To stream media content, a server computer can be used to transmit the media content to client applications that play back the media content to users. When the media content is for live events, such as live concerts, sports games, etc., the server computer that streams the live media content is sometimes referred to as a "live origin server." Live origin servers oftentimes implemented optimizations to improve the performance of those servers during the streaming of live media content. For example, the optimizations can minimize latency so that live media content is streamed more quickly to user devices. As another example, the optimizations can maximize throughput so that live media content is streamed to a larger number of user devices.

One drawback of conventional live origin servers is the optimizations to improve the performance of those servers can be very computationally expensive. After live media content has been streamed in real-time for live events, continuing to use a live origin server to store and transmit the live media content can be wasteful if the optimizations of that live origin server are no longer required. Returning to the above examples, optimizations to minimize the latency and maximize the throughput of the live origin server may not be required for research and investigation purposes after live events have ended. However, few, if any, effective techniques currently exist for storing media content associated with live events after the live events have ended without the computational expense associated with storing such media content on live origin servers.

As the foregoing illustrates, what is needed in the art are more effective techniques for managing media content stored on live origin servers.

SUMMARY

One embodiment of the present disclosure sets forth a computer-implemented method for storing media content associated with live streaming events. The method includes determining that a live streaming event has ended. The method further includes in response, identifying a plurality of data files associated with the live streaming event. In addition, the method includes copying the plurality of data files from a first storage associated with a live origin server to a second storage for further access.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that, with the disclosed techniques, media content that is associated with live streaming events and stored on a live origin server is automatically archived to a less computationally expensive secondary storage system after a certain period of time and deleted from the live origin server. Consequently, the media content can then be stored long-term in the secondary storage system without incurring the computational expense associated with continuing to store the media content on the live origin server. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
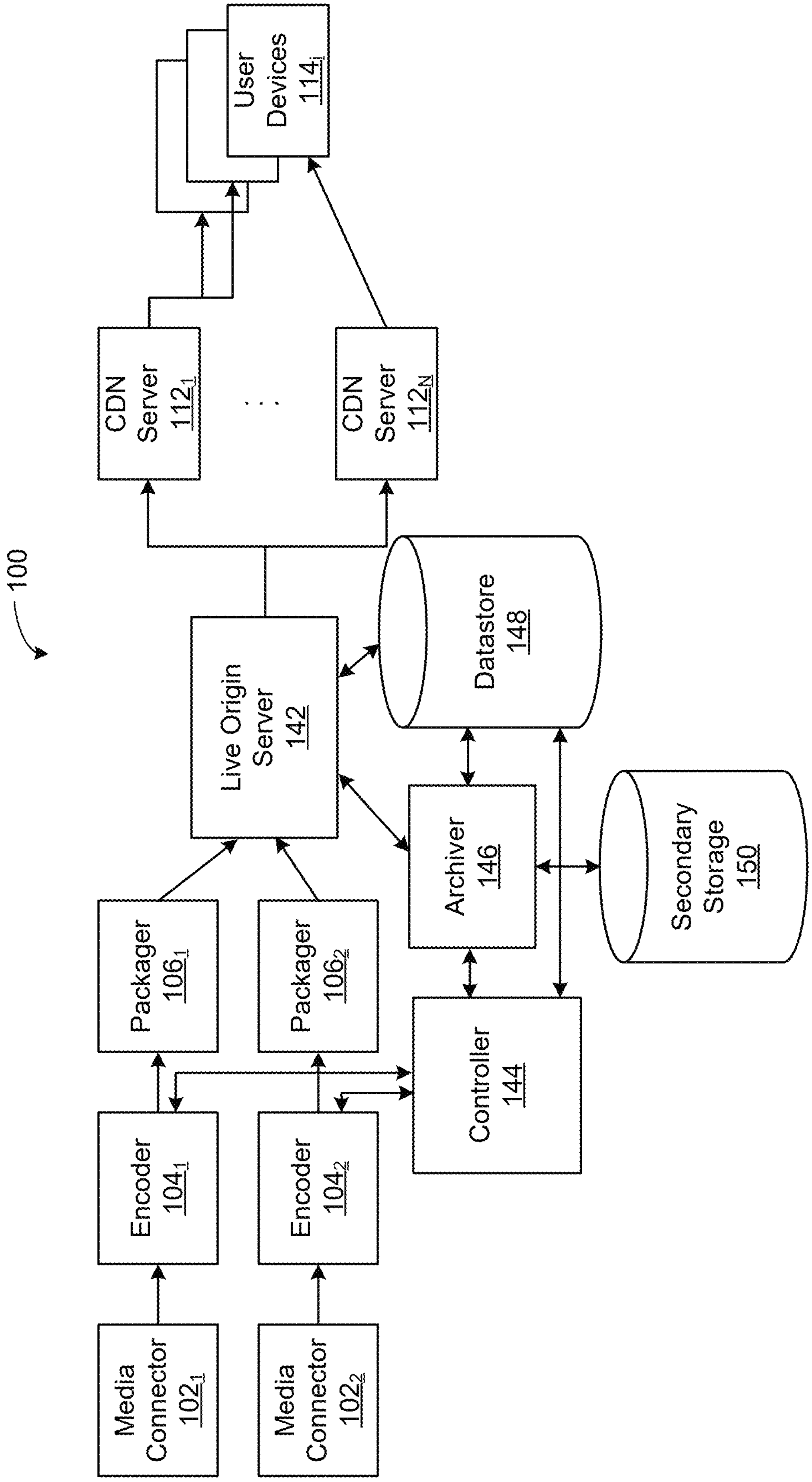
FIG. 1 illustrates a block diagram of a computer-based system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As described, one drawback of conventional live origin servers is such servers can be very computationally expensive to operate due to optimizations that are implemented to improve the performance of those servers, such as to minimize the latency and maximize the throughput when media content is being streamed. After live media content has been streamed in real-time for live events, continuing to use a live origin server to store and transmit the live media content can be wasteful if the optimizations of that live origin server are no longer required. However, few, if any, effective techniques currently exist for storing media content associated with live events after the live events have ended without the computational expense associated with storing such media content on live origin servers.

The disclosed techniques provide lifecycle management of media content stored on a live origin server. In some embodiments, a controller application ("controller") manages the archival and deletion of media content stored on the live origin server. The controller determines when a live streaming event ends, such as when encoders for media content associated with the live stream events shut down, and the controller requests that an archiver application ("archiver") archive media content associated with the live streaming event that has ended. In turn, the archiver invokes an application programming interface (API) provided by the live origin server to traverse a hierarchical directory in order to determine a list of files for segments of the media content associated with the live streaming event. Then, the archiver reads the determined files from a datastore associated with the live origin server and writes the files to a secondary storage that is less computationally expensive. As the archival process can take a long time, in some embodiments, the archiver can manage failures during the archival process and automatically retry from where failures occur. In addition, the controller can manage the deletion of media content by periodically requesting that the live origin server delete expired media content associated with live stream events, which have not been modified for more than a predefined amount of time, and the controller further provides a list of protected media content the live origin should not delete.

Advantageously, with the disclosed techniques, media content that is associated with live streaming events and stored on a live origin server is automatically archived to a less computationally expensive secondary storage system after a certain period of time and deleted from the live origin server. Consequently, the media content can then be stored long-term in the secondary storage system without incurring the computational expense associated with continuing to store the media content on the live origin server.

System Overview

FIG. 1 illustrates a block diagram of a computer-based system 100 configured to implement one or more aspects of the various embodiments. As shown, system 100 includes, without limitation, media connectors 102$_{1-2}$ (referred to herein collectively as media connectors 102 and individually as a media connector 102), encoders 104$_{1-2}$ (referred to herein collectively as encoders 104 and individually as an encoder 104), packager 106$_{1-2}$ (referred to herein collectively as packagers 106 and individually as a packager 106), a live origin server 142, a control application ("controller") 144, an archiver application ("archiver") 146, a datastore 148, a secondary storage 150, and one or more CDN servers 112$_{1-N}$ (referred to herein collectively as CDN servers 112 and individually as a CDN server 112). Although two encoding pipelines are shown for illustrative purposes, any number of encoding pipelines that each include, e.g., a media connector, an encoder, and a packager, can be used in some embodiments. Illustratively, live origin server 142 is connected to datastore 148, archiver 146, and CDN servers 112. Live origin server 142 and CDN servers 112 are also in communication with one or more user devices 114*i* (referred to herein collectively as user devices 114 and individually as a user device 114) via a network (not shown), such as the Internet. Archiver 146 is also connected to datastore 148 and secondary storage 150.

Each media connector 102 is a system component or interface that receives transmitted data from media sources and live media feeds, terminates the transmission, and extracts video streams from the transmitted data. Each media connector 102 can enable the exchange of various types of media, such as video and audio, by supporting different protocols and data formats. Each media connector 102 can incorporate hardware and/or software to manage data translation, signal conversion, or protocol adaptation, ensuring appropriate routing of media content across diverse environments.

Each encoder 104 is specialized software and/or hardware designed to convert digital content into a suitable format for storage, transmission, and/or display. Each encoder 104 can process various types of content, such as audio and/or video, by applying compression algorithms and encoding schemes to transform raw data content into one or more optimized, standardized formats. Each encoder 104 can support multiple encoding standards and codecs to accommodate different content types and delivery platforms. For example, in some embodiments, each encoder 104 can perform video transcoding and generate different audio/video bit rates and segments encoded media (e.g., video, audio, and/or text) to small chunks for live distribution.

Each packager 106 is a publishing application that can create, manage, and distribute digital content across a network. Each packager 106 can manage the workflow for content updates, ensuring that content is properly prepared and formatted for dissemination. Each packager 106 can include any software for content management, authentication, and distribution automation. For example, in some embodiments, each packager 106 can take the encoded chunks from an encoder 104 and perform digital rights management (DRM) encryption, then transmit the encrypted chunks to live origin server 142.

Live origin server 142 is a server application that can transmit media content (e.g., video, audio, and/or text) and related metadata to client applications that execute in user devices 114 and play back the media content. In some embodiments, live origin server 142 receives packaged media content for distribution from packager 106, and live origin server 142 is considered the source of truth for the media content. Live origin server 142 can receive and process requests from packager 110 to write media content data and/or associated manifest information (also referred to herein as "write requests") to storage, shown as datastore 148. Live origin server 142 can also receive and process requests for media content data and/or manifest information (also referred to herein as "read requests") from client applications running on user devices 114 when such requests are forwarded to live origin server 142 by CDN servers 112, or when such requests are received directly from the client applications (not shown).

Datastore 148 provides non-volatile and/or volatile storage for applications and data. For example, and without limitation, media content segments (also referred to herein as "segments"), manifest information, and/or associated metadata can be stored in datastore 148. In some embodiments, datastore 148 can include one or more one or more random access memories (RAMs), fixed or removable hard disk drives, flash memory devices, CD-ROMs (compact disc read-only-memories), DVD-ROMs (digital versatile disc-ROMs), Blu-rays, HD-DVDs (high definition DVDs), and/or other magnetic, optical, or solid state storage devices. In some embodiments, datastore 148 can be a network attached storage (NAS) and/or a storage area-network (SAN).

Secondary storage 150 provides non-volatile storage for applications and data. Secondary storage 150 can be less computationally expensive to operate than datastore 148. Any technically feasible cloud storage can be used as secondary storage 150 in some embodiments. In some embodiments, secondary storage 150 can include one or more random access memories (RAMs), fixed or removable hard disk drives, flash memory devices, CD-ROMs (compact disc read-only-memories), DVD-ROMs (digital versatile disc-ROMs), Blu-rays, HD-DVDs (high definition DVDs), and/or other magnetic, optical, or solid state storage devices.

Archiver 146 is an application configured to archive media content associated with live streaming events from datastore 148 into secondary storage 150. As discussed in greater detail below in conjunction with FIG. 3, to archive media content associated with a live streaming event, archiver 146 invokes an application programming interface (API) provided by live origin server 142 to traverse a hierarchical directory and determine a list of files associated with segments of the media content. Then, archiver 146 reads the segments from datastore 148 and writes the segments to secondary storage 150. In addition, archiver 146 can manage failure and automatically retry from where failures occur.

Controller 144 is an application configured to control the archiving and deletion of media content from datastore 148. As discussed in greater detail below in conjunction with FIG. 3, to control the archiving of media content, controller 144 determines when live streaming events have ended, and controller 144 requests that archiver 146 store media content associated with live streaming events that have ended when one or more criteria for the archiving are satisfied. To control the deletion of media content, controller 144 periodically transmits, to live origin server 142, requests to delete expired media content and lists of protected media content ("protected lists") that are not to be deleted. In response to such requests, live origin server 142 deletes any expired media content that is not on the protected lists.

CDN servers 112 include one or more specialized computing devices designed to efficiently deliver media content, such as segments of media associated with live streaming events, to client applications. CDN servers 112 can be geographically distributed to minimize the distance media content travels when being delivered to clients, such as user devices 114. CDN servers 112 can be positioned at the edge of a network, closer to clients. CDN servers 112 can also act as intermediaries between clients and live origin server 142 by requesting media content from live origin server 142 when such media content is not available in CDN servers 112 cache. In some embodiments, CDN servers 112 can distribute incoming traffic among multiple servers to optimize resource use, avoid overload, and increase performance.

User devices 114 are electronic devices that individuals utilize to interact with digital content or services over a network. User devices 114 can include, but are not limited to, personal computers, laptops, smartphones, tablets, smart TVs, gaming consoles, and/or wearable devices such as smartphones with an application to stream media content. Client applications (not shown) running on user devices 114 can connect to and communicate with CDN servers 112, live origin server 142, and/or other network components to access, consume and manipulate content or engage in various digital activities, such as streaming media content. User devices 114 can include processors, memory, communication interfaces, and user interfaces.

System 100 shown herein is for illustrative purposes only, and variations and modifications are possible without departing from the scope of the present disclosure. For example, the number and types of servers, and/or the number of user devices can be modified as desired. Further, the connection topology between the various units in FIG. 1 can be modified as desired. In some embodiments, any combination of the server(s) and/or user devices can be included in and/or replaced with any type of virtual computing system, distributed computing system, and/or cloud computing environment, such as a public, private, or a hybrid cloud system.

Figure 2:
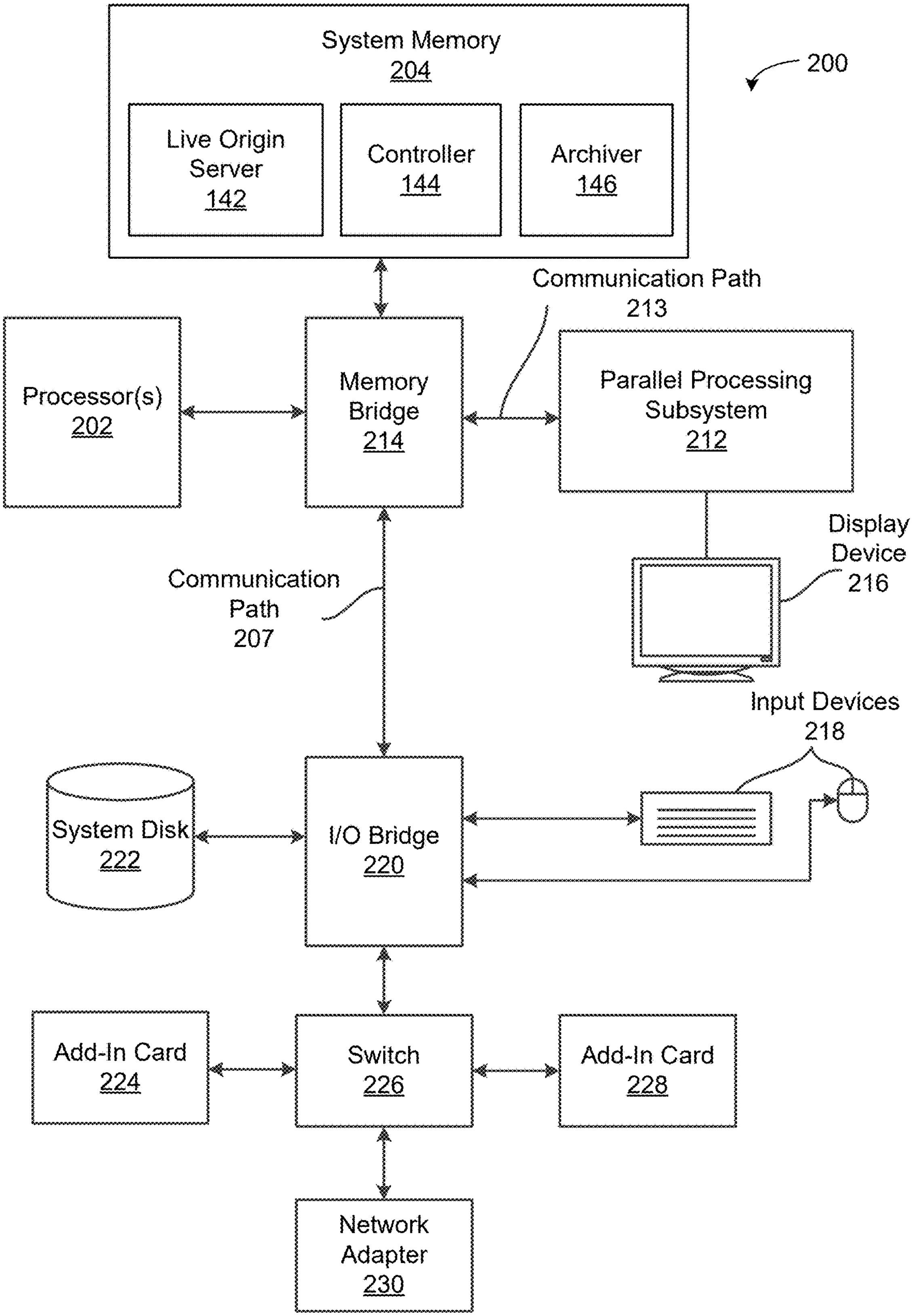
FIG. 2 illustrates a computing device via which any one of the live origin server, the controller, or the archiver of FIG. 1 can be implemented, according to the various embodiments.

FIG. 2 illustrates a computing device 200 via which any one of live origin server 142, controller 144, or archiver 146 of FIG. 1 can be implemented, according to the various embodiments. Computing device 200 may be any type of computing device, including, without limitation, a server machine, a server platform, a desktop machine, a laptop machine, a hand-held/mobile device, a digital kiosk, an in-vehicle infotainment system, and/or a wearable device. In some embodiments, computing device 200 is a server machine operating in a data center or a cloud computing environment that provides scalable computing resources as a service over a network.

As shown, the computing device 200 includes, without limitation, processor(s) 202 and system memory(ies) 204 coupled to a parallel processing subsystem 212 via a memory bridge 214 and a communication path 213. Memory bridge 214 is further coupled to an I/O (input/output) bridge 220 via a communication path 207, and I/O bridge 220 is, in turn, coupled to a switch 226.

In various embodiments, I/O bridge 220 is configured to receive user input information from optional input devices 218, such as a keyboard, mouse, touch screen, sensor data analysis (e.g., evaluating gestures, speech, or other information about one or more uses in a field of view or sensory field of one or more sensors), and/or the like, and forward the input information to the processor(s) 202 for processing. In some embodiments, computing device 200 may be a server machine in a cloud computing environment. In such embodiments, computing device 200 may not include input devices 218, but may receive equivalent input information by receiving commands (e.g., responsive to one or more inputs from a remote computing device) in the form of messages transmitted over a network and received via the network adapter 230. In some embodiments, switch 226 is configured to provide connections between I/O bridge 220 and other components of computing device 200, such as a network adapter 230 and various add-in cards 224 and 228.

In some embodiments, I/O bridge 220 is coupled to a system disk 222 that may be configured to store content and applications and data for use by processor(s) 202 and parallel processing subsystem 212. In one embodiment, system disk 222 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. In various embodiments, other components, such as universal serial bus or other port connections, compact disc drives, digital versatile disc drives, film recording devices, and the like, may be connected to I/O bridge 220 as well.

In various embodiments, memory bridge 214 may be a Northbridge chip, and I/O bridge 220 may be a Southbridge chip. In addition, communication paths 207 and 213, as well as other communication paths within computing device 200, may be implemented using any technically suitable protocols, including, without limitation, AGP (Accelerated Graphics Port), HyperTransport, or any other bus or point-to-point communication protocol known in the art.

In some embodiments, parallel processing subsystem 212 comprises a graphics subsystem that delivers pixels to an optional display device 216 that may be any conventional cathode ray tube, liquid crystal display, light-emitting diode display, and/or the like. In such embodiments, the parallel processing subsystem 212 may incorporate circuitry optimized for graphics and video processing, including, for example, video output circuitry. Such circuitry may be incorporated across one or more parallel processing units (PPUs), also referred to herein as parallel processors, included within the parallel processing subsystem 212.

In some embodiments, the parallel processing subsystem 212 incorporates circuitry optimized (e.g., that undergoes optimization) for general purpose and/or compute processing. Again, such circuitry may be incorporated across one or more PPUs included within parallel processing subsystem 212 that are configured to perform such general purpose and/or compute operations. In yet other embodiments, the one or more PPUs included within parallel processing subsystem 212 may be configured to perform graphics processing, general purpose processing, and/or compute processing operations. Memory 204 includes at least one device driver configured to manage the processing operations of the one or more PPUs within parallel processing subsystem 212.

Illustratively, memory 204 includes, without limitation, live origin server 142, controller 144, and archiver 146. Although shown as being stored in the memory, and executing on the processor(s) 202 of a single computing device 200 for illustrative purposes, live origin server 142, controller 144, and archiver 146 can be stored in the memory, and execute on the processor(s) of, any number of computing devices in some embodiments. For example, live origin server 142, controller 144, and archiver 146 could each execute on a different computing device.

In various embodiments, parallel processing subsystem 212 may be integrated with one or more of the other elements of FIG. 2 to form a single system. For example, parallel processing subsystem 212 may be integrated with processor 202 and other connection circuitry on a single chip to form a system on a chip (SoC).

In some embodiments, communication path 213 is a PCI Express link, in which dedicated lanes are allocated to each PPU. Other communication paths may also be used. The PPU advantageously implements a highly parallel processing architecture, and the PPU may be provided with any amount of local parallel processing memory (PP memory).

It will be appreciated that the system shown herein is illustrative and that variations and modifications are possible. The connection topology, including the number and arrangement of bridges, the number of CPUs 202, and the number of parallel processing subsystems 212, may be modified as desired. For example, in some embodiments, system memory 204 could be connected to the processor(s) 202 directly rather than through memory bridge 214, and other devices may communicate with system memory 204 via memory bridge 214 and processor 202. In other embodiments, parallel processing subsystem 212 may be connected to I/O bridge 220 or directly to processor 202, rather than to memory bridge 214. In still other embodiments, I/O bridge 220 and memory bridge 214 may be integrated into a single chip instead of existing as one or more discrete devices. In certain embodiments, one or more components shown in FIG. 2 may not be present. For example, switch 226 could be eliminated, and network adapter 230 and add-in cards 224, 228 would connect directly to I/O bridge 220. Lastly, in certain embodiments, one or more components shown in FIG. 2 may be implemented as virtualized resources in a virtual computing environment, such as a cloud computing environment. In particular, the parallel processing subsystem 212 may be implemented as a virtualized parallel processing subsystem in at least one embodiment. For example, the parallel processing subsystem 212 may be implemented as a virtual graphics processing unit(s) (vGPU(s)) that renders graphics on a virtual machine(s) (VM(s)) executing on a server machine(s) whose GPU(s) and other physical resources are shared across one or more VMs.

Storage Lifecycle Management for Live Origin Servers

Figure 3:
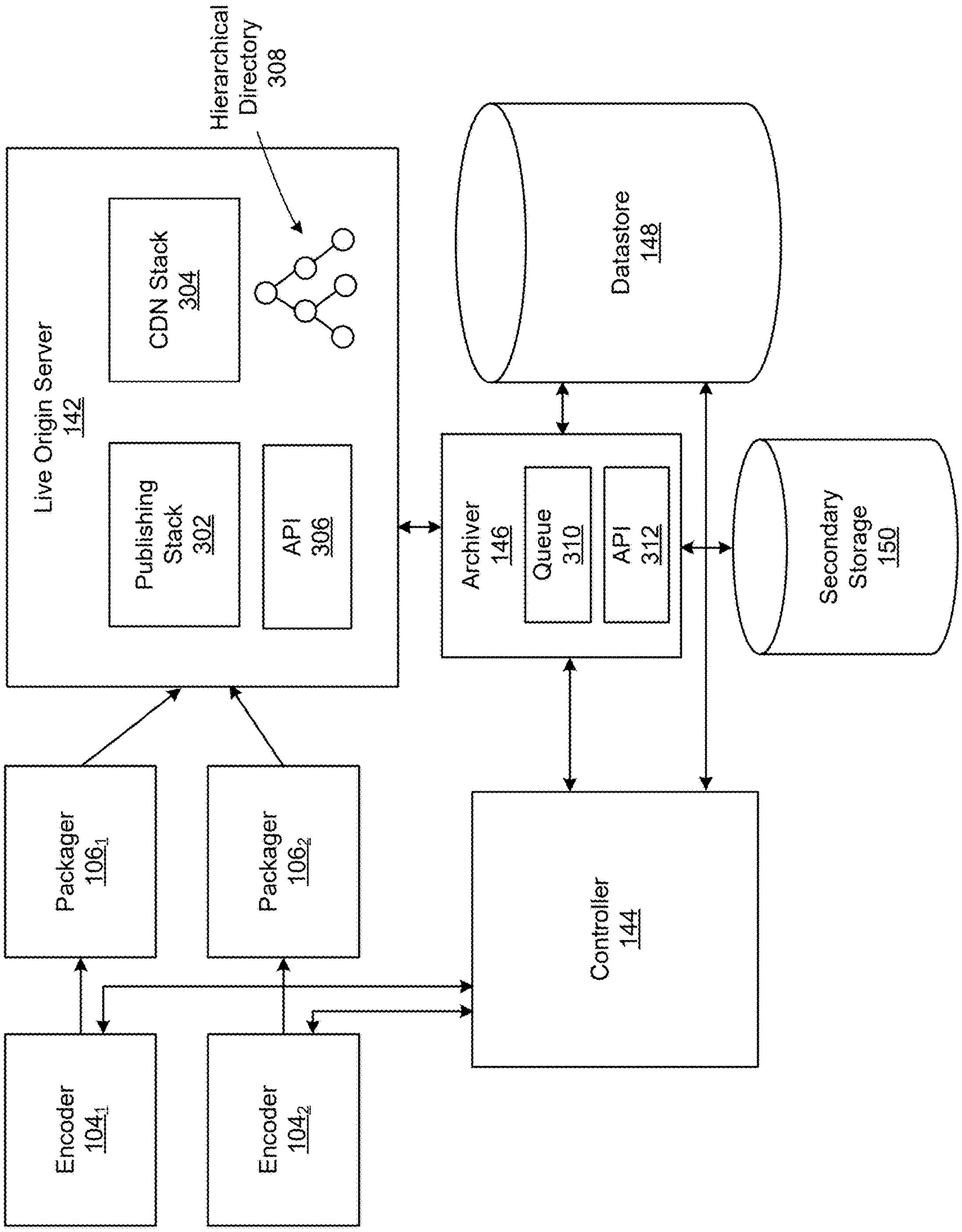
FIG. 3 illustrates how the lifecycle of media content stored on a live origin server is managed, according to various embodiments.

FIG. 3 illustrates how the lifecycle of media content stored on live origin server 142 is managed, according to various embodiments. As shown, live origin server 142 includes a publishing stack 302, a CDN stack 304, an application programming interface (API) 306, and a hierarchical directory 308. In operation, live origin server 142 can receive and process write requests from packagers 106 and read requests from CDN servers 112.

A write request is a request from a packager 106 to write a segment of media content and/or manifest information to live origin server 142. For example, a write request could request to write the segment of media content related to a live event. In response to receiving a write request, publishing stack 302 of live origin server 142 writes media content data included in the write request to datastore 148.

A read request is a request for a media content segment and/or manifest information from live origin server 142. For example, a read request could request, from live origin server 142, a segment of a live streaming media content having a particular ID or, after a live stream event has ended, a segment of a digital video recording (DVR) media content having a particular ID. In response to receiving a read request, CDN stack 304 of live origin server 142 reads from datastore 148 data, such as a media content segment or manifest information, that is being requested and returns such data to a client application or CDN server 112 that made the read request.

Hierarchical directory 308 is a tree data structure that stores tags associated with segments of media content associated with one or more live streaming events. Hierarchical directory 308 provides a logical structure for organizing and browsing content from different live streaming events or the same live streaming event. Although one hierarchical directory 308 for all live streaming events is shown for illustrative purposes, in some embodiments, multiple hierarchical directories can be used, such as a different hierarchical directory for each live streaming event. Hierarchical directory 308 is mapped to physical storage (e.g., datastore 148) but abstracts out the underlying storage, partition(s), and/or optimization(s) thereof. Hierarchical directory 308 permits the controlled and relatively fast browsing and identification of files for media content associated with a live streaming event, when compared to directly reading content stored on datastore 148. Any suitable tags can be used in hierarchical directory 308 in some embodiments. For example, in some embodiments, the tags can include event, encoder, camera, encoding group, media variant, and segment ID tags because each live streaming event can have one or more encoders, support multiple cameras and encoding formats, bitrate ladders (i.e., variants), and be divided into segments of media content that are each a few seconds in length. In such cases, the tags can be stored in different levels of the tree data structure.

In some embodiments, when live origin server 142 receives a write request to write a media content segment, the write request includes a uniform resource identifier (URI) that specifies hierarchical tags associated with the media content segment. Returning to the above example in which the tags include event, encoder, camera, encoding group, media variant, and segment ID, the URI could be in the form: /<prefix>/<event>/<encoder>/<camera>/<encodingGroup>/<variant>/segment_<number>.suffix. In this example, the prefix can be used to categorize events and manage the storage of media content for events. For example, media content associated with a prefix of "testing event" could be stored for less time than media content associated with a prefix of "production event." As another example, the prefix could indicate an event year. Accordingly, the prefix can be used to configure the lifecycle policy for stored media content. In some embodiments, hierarchical directory 308 can also be copied to secondary storage 150 and used therein to manage the storage of associated files. For example, the prefix can also be used to manage how long media content associated with different categories of events (e.g., testing events, production events, etc.) are stored on secondary storage 150 before being deleted from live origin server 142.

API 306 is a set of rules and protocols that allows software applications to communicate with live origin server 142. In some embodiments, API 306 includes functions that can be called to traverse hierarchical directory 308, including (1) providing a high-level directory hierarchy snapshot of sub-directories associated with a live streaming event, such as each variant (i.e., bitrate ladder) of media content associated with the live streaming event; and (2) for each variant, scanning all the segments for that variant. In such cases, the scanning can be performed via a paging technique that returns a maximum number (e.g., 100) of segments for each API 306 call. Paging can be faster and more easily processed than attempting to return all of the segments at once.

Archiver 146 is configured to store media content from datastore 148 into secondary storage 150. In some embodiments, archiver 146 can be implemented as a background service in a separate computing cluster that does not impact the critical path of live origin server's 142 operation. In some embodiments, for media content associated with a live streaming event that is being archived, archiver 146 uses API 306 provided by live origin server 142 to traverse hierarchical directory 308 in order to determine the list of files associated with segments of the media content. In such cases, archiver 146 can scan segments for each variant of the media content via the paging technique, described above, to obtain all of the files for segments associated with the media content. Archiver 146 then reads those files from datastore 148 and writes the files to secondary storage 150, from which the files can be accessed for any suitable purpose, such as providing a video on demand (VOD) service, research to improve quality of media content and/or streaming of the same, investigation, and/or the like.

In some embodiments, given that the archival of a live-streamed event can take a long time, archiver 146 is designed to manage failure during the archival process and automatically retry from where failures occur. In such cases, after interruptions during the archival process, such as if the cloud instance for archiving restarts, archiver 146 can compare files in secondary storage 150 with the list of files to be archived to determine which files still need to be archived. Then, archiver 146 can continue reading files that still need to be archived from datastore 148 and copy the files to secondary storage 150.

Illustratively, archiver 146 includes a queue 310 and an API 312. When there are concurrent live streaming events to archive, queue 310 is used to pace the archival process. Requests to archive media content associated with each live streaming event are placed in queue 310, and archiver 146 picks from the queue to archive media content associated with each live streaming event according to the techniques disclosed herein.

API 312 is a set of rules and protocols that allows software applications to communicate with archiver 146. In some embodiments, API 312 can include one or more functions that can be called to request the archiving of media content stored in datastore 148.

Controller 144 is configured to control the archiving and deletion of media content from datastore 148. To control the archiving of media content, controller 144 determines when live streaming events have ended. Controller 144 calls API 312 to archive media content associated with live streaming events that have ended when one or more criteria for the archiving are satisfied. In some embodiments, controller 144 can determine that a live streaming event has ended when one or more encoders for encoding media content associated with the live streaming event shut down. In such cases, the encoder(s) can be created for the live streaming event and are shut down when the live streaming event ends. Controller 144 can receive notifications about the encoder(s), such as when encoder(s) are started up or are shut down, and controller 144 calls API 312 to request that archiver 146 archive media content associated with the live streaming event that has ended if one or more criteria for the archiving are satisfied. Any suitable criterion or criteria for archiving, including manually defined criteria, can be used in some embodiments. For example, the criteria for archiving could specify that public-facing media content are archived and other media content, such as media content that are used solely for testing purposes, are not archived. Although described herein primarily with respect to the archiving of media content associated with a live streaming event being triggered when encoder(s) shut down, in some embodiments, such archiving can be triggered in any technically feasible manner, such as in response to user requests via a user interface (UI) provided by controller 144. In some embodiments, the controller 144 can also provide a UI that shows the archiving status of the live streaming events to users, including when the events were created, when the events will be deleted, and/or whether the events have been archived.

To control the deletion of media content, controller 144 periodically transmits, to live origin server 142 via API 306 or another API, requests to delete expired media content. More generally, controller 144 can transmit requests to delete expired media content to live origin server 142 based on any suitable factor or factors, such as total capacity of the datastore 148, a total number of stored events in datastore 148, a current utilization of datastore 148, and/or exclusion business rules, such as special events (e.g., excluded special DVR events, excluded testing events, etc.) for events that are not to be deleted. In some embodiments, media content associated with live streaming events can also be stored beyond the end of the live events for a period of time, during which the media content can be accessed as DVR content. Along with each request, controller 144 passes, to live origin server 142 and via the API, a list of protected media content that are not to be deleted. For example, controller 144 could transmit requests to delete expired media content and protected lists every hour. Each protected list can be specified manually and/or automatically generated. For example, a protected list can include media content that is used for testing purposes and should, therefore, be stored in datastore 148 for longer than other media content. In response to a request to delete expired media content, live origin server 142 determines a list of expired media content. In some embodiments, live origin server 142 keeps track of when files associated with media content are last modified, and expired media content are media content whose files that were last modified more than a predefined amount of time (e.g., a certain number of days) ago. Live origin server 142 removes, from the list of expired media content, any media content that are in the protected list transmitted by controller 144. Then, live origin server 142 deletes, from datastore 148, files associated with the remaining expired media content.

Figure 4:
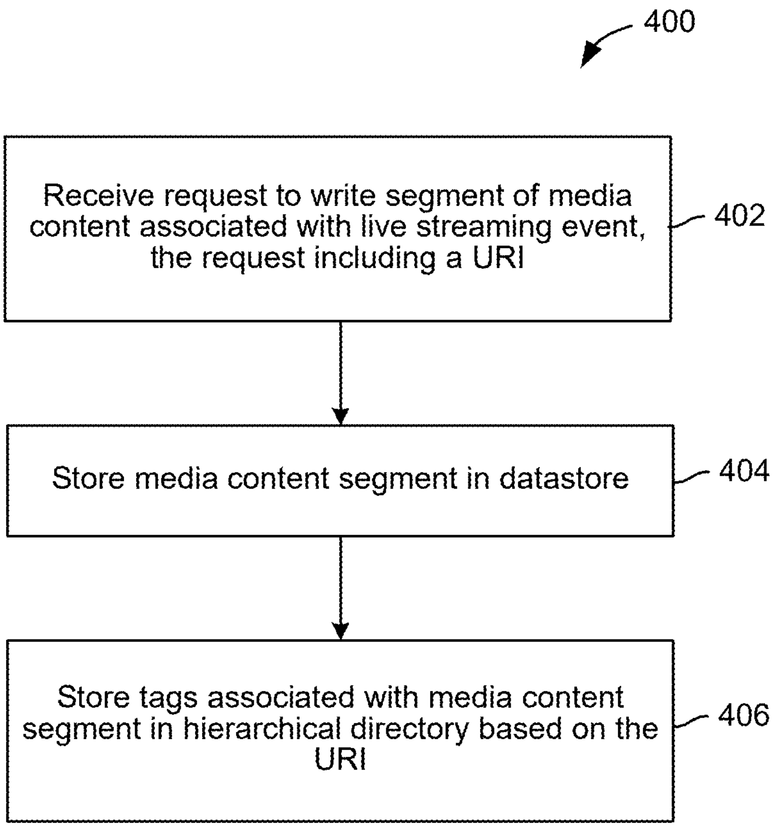
FIG. 4 is a flow diagram of method steps for generating a hierarchical directory of tags for media content segments, according to various embodiments.

FIG. 4 is a flow diagram of method steps for generating a hierarchical directory of tags for media content segments, according to various embodiments. Although the method steps are described in conjunction with the systems of FIGS. 1-3, persons skilled in the art will understand that any system configured to perform the method steps in any order falls within the scope of the various embodiments.

As shown, a method 400 begins at step 402, where live origin server 142 receives a request to write a segment of media content associated with a live streaming event. The request includes a URI that specifies hierarchical tags associated with the media content segment. Any suitable tags can be specified in some embodiments. For example, in some embodiments, the tags can include an event, encoder, camera, encoding group, media variant, and segment ID tags.

At step 404, live origin server 142 stores the media content segment in datastore 148 based on the request.

Then, at step 406, live origin server 142 stores tags associated with the media content segment in hierarchical directory 308 based on the URI included in the request. As described above in conjunction with FIG. 3, hierarchical directory 308 can be a tree data structure that stores tags associated with media content segments.

Figure 5:
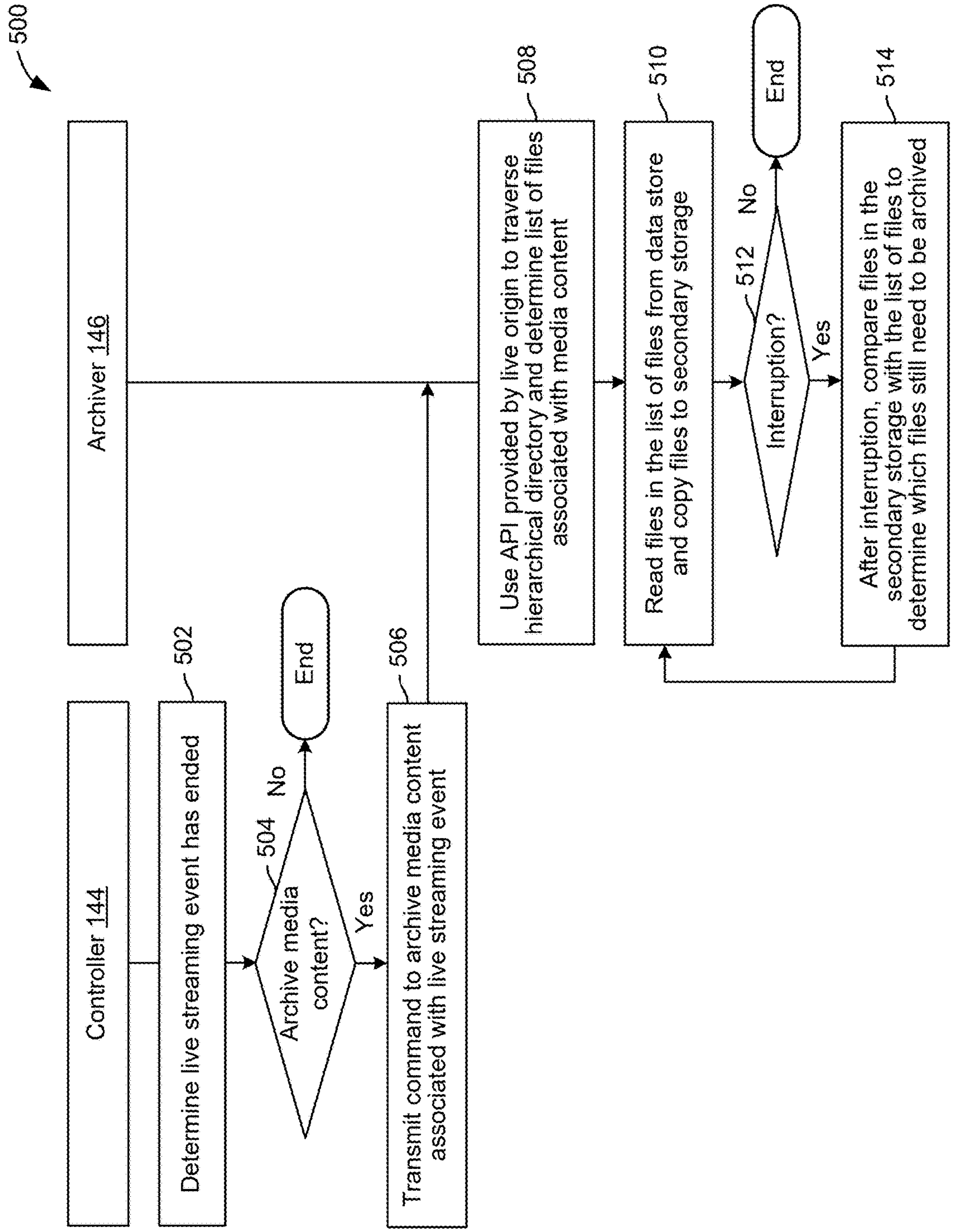
FIG. 5 is a flow diagram of method steps for archiving media content associated with live streaming events on a secondary datastore, according to various embodiments.

FIG. 5 is a flow diagram of method steps for archiving media content associated with live streaming events on a secondary datastore, according to various embodiments. Although the method steps are described in conjunction with the systems of FIGS. 1-3, persons skilled in the art will understand that any system configured to perform the method steps in any order falls within the scope of the various embodiments.

As shown, a method 500 begins at step 502, where controller 144 determines that a live streaming event has ended. In some embodiments, controller 144 can determine that a live streaming event has ended when one or more encoders for media content associated with the live streaming event shut down. In such cases, the encoder(s) can be created for the live streaming event and shut down when the live streaming event ends, and controller 144 can receive a notification when each of the encoder(s) shuts down.

At step 504, controller 144 determines whether to archive media content associated with the live streaming event that ended. If controller 144 determines not to archive such media content, then method 500 ends. For example, in some embodiments, controller 144 could archive public-facing media content and not archive other media content, such as media content that is used solely for testing.

On the other hand, if controller 144 determines to archive the media content, then at step 506, controller 144 transmits, to archiver 146, a command to archive the media content. In some embodiments, when there are concurrent live streaming events to archive, queue 310 in archiver 146 is used to pace the archival process. Requests to archive media content associated with each live streaming event are placed in queue 310, and archiver 146 picks from the queue to archive media content associated with each live streaming event.

At step 508, archiver 146 uses API 306 provided by live origin server 142 to traverse hierarchical directory 408 and determine the list of files associated with segments of the media content associated with the live streaming event that has ended. In some embodiments, archiver 146 can call functions provided by API 306 to (1) obtain a high-level directory hierarchy snapshot of sub-directories associated with a live streaming event, such as each variant (i.e., bitrate ladder) of media content associated with the live streaming event; and (2) for each variant, scan all the segments for that variant via a paging technique that returns a maximum number (e.g., 100) of segments for each API call, as described above in conjunction with FIG. 3.

At step 510, archiver 146 reads files in the list of files that is determined at step 508 from datastore 148 and copies the files to secondary storage 150. Archiver 146 can copy the files by writing the files that are read from datastore 148 to secondary storage 150.

At step 512, if there is no interruption of the archival process, then method 500 ends after archiver 146 finishes reading files in the list of files from datastore 148 and copies the files to secondary storage 150 at step 510. On the other hand, if there is an interruption, then at step 514, after the interruption ends, archiver 146 compares files in secondary storage 150 with the list of files to be archived to determine which files still need to be archived. Method 500 then returns to step 510, where archiver 146 continues reading files in the list of files that still need to be archived from datastore 148 and copies those files to secondary storage 150.

Figure 6:
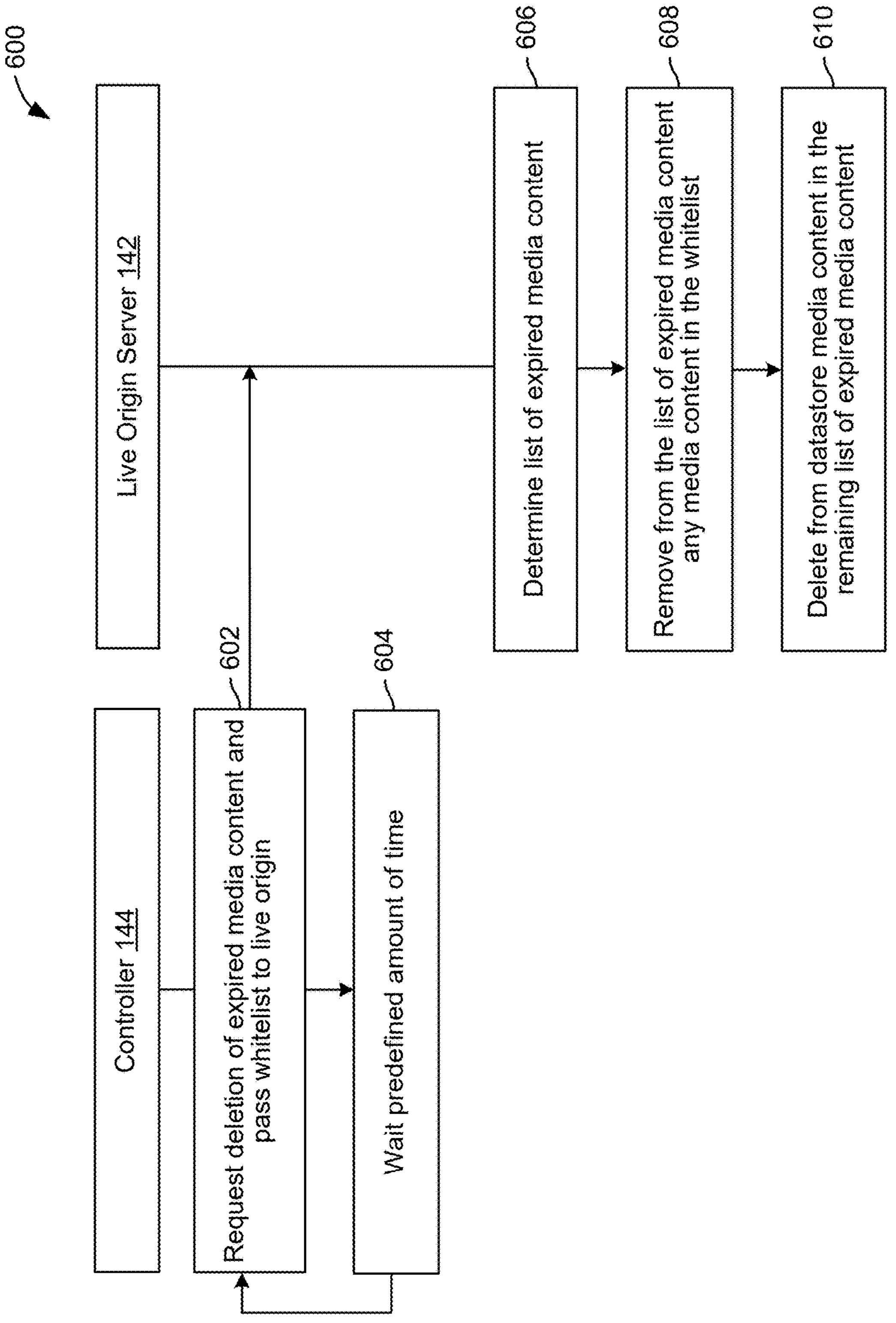
FIG. 6 is a flow diagram of method steps for deleting expired media content from a live origin server, according to various embodiments.

FIG. 6 is a flow diagram of method steps for deleting expired media content from a live origin server, according to various embodiments. Although the method steps are described in conjunction with the systems of FIGS. 1-3, persons skilled in the art will understand that any system configured to perform the method steps in any order falls within the scope of the various embodiments.

As shown, a method 600 begins at step 602, where controller 144 transmits a request to delete expired media content to live origin server 142. In addition, controller 144 passes a protected list to live origin server 142. The protected list includes media content that is not to be deleted. In some embodiments, the protected list can be specified manually and/or automatically generated, as described above in conjunction with FIG. 3.

At step 604, controller 144 waits a predefined amount of time before method 600 returns to step 602, where controller 144 transmits another request to delete expired media content and passes another protected list to live origin server 142. For example, in some embodiments, controller 144 can wait one hour before transmitting another request to delete expired media content and passing another protected list to live origin server 142.

At step 606, after receiving the request to delete expired media content and the protected list, live origin server 142 determines a list of expired media content. In some embodiments, live origin server 142 keeps track of when files for media content associated with live streaming events are last modified. In such cases, live origin server 142 can determine the expired media content to be media content whose files were last modified more than a predefined amount of time (e.g., a certain number of days) ago.

At step 608, live origin server 142 removes, from the list of expired media content determined at step 606, any media content that are in the protected list received at step 602. As described, the protected list includes media content that are not to be deleted.

At step 610, live origin server 142 deletes, from datastore 148, media content in the list of expired media content that were not removed at step 608. For example, in some embodiments, live origin server 142 can transmit, to datastore 148, requests to delete files for segments of the media content in the list of expired media content that were not removed at step 608.

In sum, techniques are disclosed for managing the lifecycles of media content stored on a live origin server. In some embodiments, a controller manages the archival and deletion of media content stored on the live origin server. The controller determines when a live streaming event ends, such as when encoders for media content associated with the live stream events shut down, and the controller requests that an archiver archive media content associated with the live streaming event that has ended. In turn, the archiver invokes an API provided by the live origin server to traverse a hierarchical directory in order to determine a list of files for segments of the media content associated with the live streaming event. Then, the archiver reads the determined files from a datastore associated with the live origin server and writes the files to a secondary storage that is less computationally expensive. As the archival process can take a long time, in some embodiments, the archiver can manage failures during the archival process and automatically retry from where failures occur. In addition, the controller can manage the deletion of media content by periodically requesting that the live origin server delete expired media content associated with live stream events, which have not been modified for more than a predefined amount of time, and the controller further provides a list of protected media content the live origin should not delete.

At least one technical advantage of the disclosed techniques relative to the prior art is that, with the disclosed techniques, media content that is associated with live streaming events and stored on a live origin server is automatically archived to a less computationally expensive secondary storage system after a certain period of time and deleted from the live origin server. Consequently, the media content can then be stored long-term in the secondary storage system without incurring the computational expense associated with continuing to store the media content on the live origin server. These technical advantages represent one or more technological improvements over prior art approaches.

1. In some embodiments, a computer-implemented method for storing media content associated with live streaming events comprises determining that a live streaming event has ended, in response, identifying a plurality of data files associated with the live streaming event, and copying the plurality of data files from a first storage associated with a live origin server to a second storage for further access.

2. The computer-implemented method of clause 1, wherein identifying the plurality of data files comprises traversing a hierarchical directory of tags associated with one or more live streaming events.

3. The computer-implemented method of clauses 1 or 2, further comprising receiving a request to store at least one data file included in the plurality of data files in the first storage, wherein the request includes an identifier that specifies one or more tags associated with the at least one data file, and storing the one or more tags in the hierarchical directory.

4. The computer-implemented method of any of clauses 1-3, wherein the hierarchical directory comprises a tree data structure.

5. The computer-implemented method of any of clauses 1-4, wherein determining that the live streaming event has ended comprises receiving one or more notifications that one or more encoders associated with the live streaming event have terminated.

6. The computer-implemented method of any of clauses 1-5, further comprising determining that the plurality of data files has expired, and deleting the plurality of data files from the first storage.

7. The computer-implemented method of any of clauses 1-6, further comprising determining the live streaming event is not included in a list of live streaming events for which data files are not to be deleted.

8. The computer-implemented method of any of clauses 1-7, wherein determining that the plurality of data files has expired comprises determining that a predefined amount of time has passed since a last modification was made to at least one data file included in the plurality of data files.

9. The computer-implemented method of any of clauses 1-8, further comprising periodically deleting data files stored in the first storage based on a predefined expiration time.

10. The computer-implemented method of any of clauses 1-9, further comprising, in response to an interruption when copying the plurality of data files comparing one or more data files stored in the second storage with the plurality of data files to identify at least one data file included in the plurality of data files that has not been copied to the second storage, and copying the at least one data file from the first storage to the second storage.

11. In some embodiments, one or more non-transitory computer-readable media store program instructions that, when executed by at least one processor, cause the at least one processor to perform the steps of determining that a live streaming event has ended, in response, identifying a plurality of data files associated with the live streaming event, and copying the plurality of data files from a first storage associated with a live origin server to a second storage for further access.

12. The one or more non-transitory computer-readable media of clause 11, wherein identifying the plurality of data files comprises traversing a hierarchical directory of tags associated with one or more live streaming events.

13. The one or more non-transitory computer-readable media of clauses 11 or 12, wherein traversing the hierarchical directory comprising paging a predefined number of tags a plurality of times.

14. The one or more non-transitory computer-readable media of any of clauses 11-13, wherein the instructions, when executed by the at least one processor, further cause the at least one processor to perform the steps of receiving a request to store at least one file included in the plurality of files in the first storage, wherein the request includes an identifier that specifies one or more tags associated with the live streaming event, and storing the one or more tags in the hierarchical directory.

15. The one or more non-transitory computer-readable media of any of clauses 11-14, wherein the one or more tags include at least one of an event tag, an encoder tag, a camera tag, an encoding group tag, a bitrate ladder tag, or a segment identifier tag.

16. The one or more non-transitory computer-readable media of any of clauses 11-15, wherein the instructions, when executed by the at least one processor, further cause the at least one processor to perform the copying the hierarchical directory from the live origin server to the second storage.

17. The one or more non-transitory computer-readable media of any of clauses 11-16, wherein the instructions, when executed by the at least one processor, further cause the at least one processor to perform the steps of determining that the plurality of data files has expired, and deleting the plurality of data files from the first storage.

18. The one or more non-transitory computer-readable media of any of clauses 11-17, wherein the instructions, when executed by the at least one processor, further cause the at least one processor to perform the step of determining the live streaming event is not included in a list of live streaming events for which data files are not to be deleted.

19. The one or more non-transitory computer-readable media of any of clauses 11-18, wherein the instructions, when executed by the at least one processor, further cause the at least one processor to perform the steps of comparing one or more data files stored in the second storage with the plurality of data files to identify at least one data file included in the plurality of data files that has not been copied to the second storage, and copying the at least one data file from the first storage to the second storage.

20. In some embodiments, a system comprises one or more memories storing instructions, and one or more processors that are coupled to the one or more memories and, when executing the instructions, are configured to determine that a live streaming event has ended, in response, identify a plurality of data files associated with the live streaming event, and copy the plurality of data files from a first storage associated with a live origin server to a second storage for further access.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for storing media content associated with live streaming events, the method comprising:
determining that a live streaming event has ended;
in response, identifying a plurality of data files associated with the live streaming event by traversing a uniform resource identifier (URI) of tags associated with one or more live streaming events;
copying the plurality of data files from a first storage associated with a live origin server to a second storage for further access; and
deleting the plurality of data files from the first storage based on a prefix of the URI categorizing the live streaming event.

2. The computer-implemented method of claim 1, wherein identifying the plurality of data files comprises traversing a hierarchical directory of tags associated with the URI.

3. The computer-implemented method of claim 2, further comprising:
receiving a request to store at least one data file included in the plurality of data files in the first storage, wherein the request includes an identifier that specifies one or more tags associated with the at least one data file; and
storing the one or more tags in the hierarchical directory.

4. The computer-implemented method of claim 2, wherein the hierarchical directory comprises a tree data structure.

5. The computer-implemented method of claim 1, wherein determining that the live streaming event has ended comprises receiving one or more notifications that one or more encoders associated with the live streaming event have terminated.

6. The computer-implemented method of claim 1, further comprising:
determining that the plurality of data files has expired; and
deleting the plurality of data files from the first storage based on a determination that the plurality of data files has expired.

7. The computer-implemented method of claim 6, further comprising determining the live streaming event is not included in a list of live streaming events for which data files are not to be deleted.

8. The computer-implemented method of claim 6, wherein determining that the plurality of data files has expired comprises determining that a predefined amount of time has passed since a last modification was made to at least one data file included in the plurality of data files.

9. The computer-implemented method of claim 1, further comprising periodically deleting data files stored in the first storage based on a predefined expiration time.

10. The computer-implemented method of claim 1, further comprising, in response to an interruption when copying the plurality of data files:
comparing one or more data files stored in the second storage with the plurality of data files to identify at least one data file included in the plurality of data files that has not been copied to the second storage; and
copying the at least one data file from the first storage to the second storage.

11. One or more non-transitory computer-readable media storing program instructions that, when executed by at least one processor, cause the at least one processor to perform the steps of:
determining that a live streaming event has ended;
in response, identifying a plurality of data files associated with the live streaming event by traversing a uniform resource identifier (URI) of tags associated with one or more live streaming events;
copying the plurality of data files from a first storage associated with a live origin server to a second storage for further access; and
deleting the plurality of data files from the first storage based on a prefix of the URI categorizing the live streaming event.

12. The one or more non-transitory computer-readable media of claim 11, wherein identifying the plurality of data files comprises traversing a hierarchical directory of tags associated with the URI.

13. The one or more non-transitory computer-readable media of claim 12, wherein traversing the hierarchical directory comprising paging a predefined number of tags a plurality of times.

14. The one or more non-transitory computer-readable media of claim 12, wherein the instructions, when executed by the at least one processor, further cause the at least one processor to perform the steps of:
receiving a request to store at least one file included in the plurality of data files in the first storage, wherein the request includes an identifier that specifies one or more tags associated with the live streaming event; and
storing the one or more tags in the hierarchical directory.

15. The one or more non-transitory computer-readable media of claim 14, wherein the one or more tags include at least one of an event tag, an encoder tag, a camera tag, an encoding group tag, a bitrate ladder tag, or a segment identifier tag.

16. The one or more non-transitory computer-readable media of claim 12, wherein the instructions, when executed by the at least one processor, further cause the at least one processor to perform the step of copying the hierarchical directory from the live origin server to the second storage.

17. The one or more non-transitory computer-readable media of claim 11, wherein the instructions, when executed by the at least one processor, further cause the at least one processor to perform the steps of:
determining that the plurality of data files has expired; and
deleting the plurality of data files from the first storage based on a determination that the plurality of data files has expired.

18. The one or more non-transitory computer-readable media of claim 17, wherein the instructions, when executed by the at least one processor, further cause the at least one processor to perform the step of determining the live streaming event is not included in a list of live streaming events for which data files are not to be deleted.

19. The one or more non-transitory computer-readable media of claim 11, wherein the instructions, when executed by the at least one processor, further cause the at least one processor to perform the steps of:
comparing one or more data files stored in the second storage with the plurality of data files to identify at least one data file included in the plurality of data files that has not been copied to the second storage; and
copying the at least one data file from the first storage to the second storage.

20. A system, comprising:

one or more memories storing instructions; and one or more processors that are coupled to the one or more memories and, when executing the instructions, are configured to:

determine that a live streaming event has ended, in response, identify a plurality of data files associated with the live streaming event by traversing a uniform resource identifier (URI) of tags associated with one or more live streaming events;

copy the plurality of data files from a first storage associated with a live origin server to a second storage for further access; and deleting the plurality of data files from the first storage based on a prefix of the URI categorizing the live streaming event.

* * * * *